United States Patent
Hussain

(10) Patent No.: US 7,670,396 B2
(45) Date of Patent: Mar. 2, 2010

(54) FILTER AND METHOD OF USING THE SAME

(75) Inventor: Zafar Hussain, Perrysburg, OH (US)

(73) Assignee: Honeywell International Inc., Morristown, NJ (US)

( * ) Notice: Subject to any disclaimer, the term of this patent is extended or adjusted under 35 U.S.C. 154(b) by 772 days.

(21) Appl. No.: 11/494,268

(22) Filed: Jul. 27, 2006

(65) Prior Publication Data
US 2008/0022639 A1 Jan. 31, 2008

(51) Int. Cl.
*B01D 50/00* (2006.01)
(52) U.S. Cl. .............................. 55/320; 55/418; 55/462; 55/463; 55/464; 55/465; 55/385.3; 55/527; 55/528
(58) Field of Classification Search ................ 55/320, 55/418, 462–465, 385.3, 527, 528
See application file for complete search history.

(56) References Cited

U.S. PATENT DOCUMENTS

| | | | | |
|---|---|---|---|---|
| 2,220,706 A * | 11/1940 | Cantin | ........................ | 210/132 |
| 2,934,165 A * | 4/1960 | Dudinec | .................... | 55/385.3 |
| 3,296,777 A * | 1/1967 | Jackson et al. | ................ | 96/227 |
| 3,884,658 A * | 5/1975 | Roach | ......................... | 55/315 |
| 4,076,508 A * | 2/1978 | Christensen | ................. | 55/309 |
| 4,265,647 A * | 5/1981 | Donachiue | .................... | 55/315 |
| 4,342,730 A * | 8/1982 | Perrotta | .................... | 423/215.5 |
| 4,692,175 A * | 9/1987 | Frantz | ........................ | 96/408 |
| 4,840,645 A * | 6/1989 | Woodworth et al. | .......... | 95/270 |
| 4,948,398 A * | 8/1990 | Thomaides et al. | ........... | 95/286 |
| 6,475,255 B1 * | 11/2002 | Walker, Jr. | .................... | 55/315 |
| 6,540,801 B2 * | 4/2003 | Gieseke et al. | ................ | 55/330 |
| 6,602,308 B1 * | 8/2003 | Carle et al. | ................ | 55/385.3 |
| 7,410,529 B2 * | 8/2008 | Sellers et al. | .................. | 95/279 |
| 7,416,580 B2 * | 8/2008 | Nyman et al. | ................... | 95/90 |
| 2001/0005982 A1 * | 7/2001 | Gieseke et al. | ................ | 55/330 |
| 2002/0083837 A1 * | 7/2002 | Doherty | ......................... | 96/66 |
| 2003/0177743 A1 * | 9/2003 | Witengier | ..................... | 55/320 |
| 2004/0016345 A1 * | 1/2004 | Springett et al. | ............... | 96/66 |
| 2004/0040269 A1 * | 3/2004 | Gieseke et al. | ................ | 55/330 |
| 2005/0138910 A1 * | 6/2005 | Rohdewald et al. | ........... | 55/528 |
| 2005/0160711 A1 * | 7/2005 | Yang | ........................... | 55/524 |
| 2006/0070361 A1 * | 4/2006 | Sellers et al. | .................. | 55/303 |
| 2006/0130451 A1 * | 6/2006 | Ding et al. | .................... | 55/524 |
| 2008/0016833 A1 * | 1/2008 | Sheidler et al. | ............ | 55/385.3 |
| 2008/0086989 A1 * | 4/2008 | Sheidler | ...................... | 55/345 |

* cited by examiner

*Primary Examiner*—Jason M Greene
*Assistant Examiner*—Dung Bui
(74) *Attorney, Agent, or Firm*—Cantor Colburn LLP.

(57) ABSTRACT

A filter for filtering a fluid passing therethrough is provided. The filter includes a filter media having an outer periphery, an inner periphery, a first end portion, and a second end portion. The filter further includes a first end cap disposed on the first end portion. The filter further includes a second end cap disposed on the second end portion. The filter further includes a deflecting member disposed over a portion of the outer periphery, wherein the fluid is deflected by the deflecting member and a portion of the fluid is filtered by the filter media by entering through a portion of the outer periphery not covered by the deflecting member.

22 Claims, 4 Drawing Sheets

FILTER AND METHOD OF USING THE SAME

TECHNICAL FIELD

The present application relates generally to filters. More particularly, the present application relates to a filter configured to deflect a fluid away from a portion of the filter while another portion of the filter is configured to filter a portion of the fluid passing therethrough.

BACKGROUND

In the near future, environmental regulations will require that vehicles avoid venting air from engine crankcases to the atmosphere because the air from engines may contain oil, fuel and water vapors. An option is to route the air from the engine to a turbocharger, for vehicles equipped with a turbocharger. Turbochargers perform best when supplied with substantially clean, dry air, so the air vented from the engine needs to be filtered before being supplied to the turbocharger.

Current engine crankcase vent line air filters can become clogged with moisture, vapors and contaminates or pass moisture, vapors and contaminates to turbocharger components thereby degrading performance of the turbocharger. The inventors herein have recognized that providing a filter for filtering the air from the engine wherein the filter is configured so moisture, vapors and contaminates are first separated from the air and a remaining portion of the air is then filtered by the filter before the remaining portion of the air is supplied to the turbocharger will aid in maintaining optimal turbocharger performance.

Accordingly, there is a need for a filter for filtering a fluid wherein a first portion of the fluid having moisture, vapors and contaminants is separated from a second portion of the fluid and the second portion of the fluid then flows through a portion of the filter thereby further filtering the fluid.

SUMMARY OF THE INVENTION

A filter for filtering a fluid in accordance with an exemplary embodiment is provided. The filter includes a filter media having an outer periphery, an inner periphery, a first end portion, and a second end portion. The filter further includes a first end cap disposed on the first end portion. The filter further includes a second end cap disposed on the second end portion. The filter further includes a deflecting member disposed over a portion of the outer periphery, wherein the fluid is deflected by the deflecting member and a portion of the fluid is filtered by the filter media by entering through a portion of the outer periphery not covered by the deflecting member.

A turbocharger in accordance with another exemplary embodiment is provided. The turbocharger includes a receiving member integrated with the turbocharger, the receiving member having a receiving area, a fluid inlet, a fluid outlet, and a drain outlet. The receiving area is configured to receive a filter disposed therein, wherein the fluid inlet and the fluid outlet define a flow path through the filter disposed in the receiving area. The filter includes a filter media having an outer periphery, an inner periphery, a first end portion, and a second end portion. The filter further includes a first end cap disposed on the first end portion. The filter further includes a second end cap disposed on the second end portion. The filter further includes a deflecting member disposed over a portion of the outer periphery, wherein the fluid enters the fluid inlet and is deflected by the deflecting member and a first portion of deflected fluid flows through the drain outlet in a direction away from the portion of the filter media not covered by the deflecting member and a second portion of the deflected fluid flows along the flow path through the filter media and the fluid outlet to the turbocharger by entering the filter media through a portion of the outer periphery not covered by the deflecting member.

A method for filtering a fluid in accordance with another exemplary embodiment is provided. The method includes positioning a filter media having a covered portion and an open portion, wherein the fluid is substantially deflected by the covered portion of the filter media in a direction away from the covered portion of the filter media. The method further includes directing a first portion of deflected fluid in a direction away from the open portion of the filter media, wherein a second portion of the deflected fluid flows through the open portion of the filter media thereby filtering the second portion of the deflected fluid.

DETAILED DESCRIPTION OF EXEMPLARY EMBODIMENTS

Figure 1:
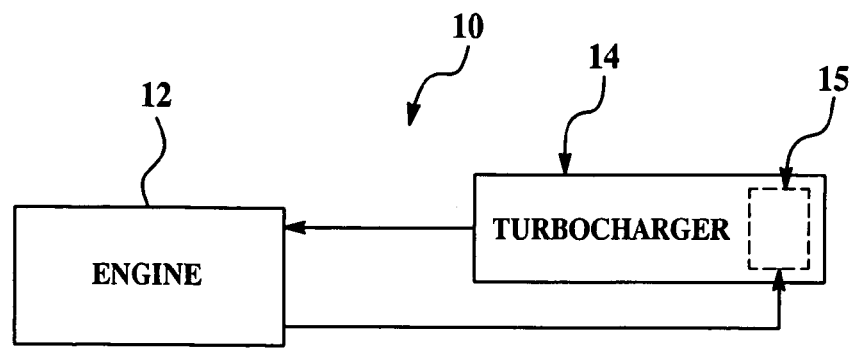
FIG. 1 is a schematic illustrating an engine and a turbocharger assembly having a filter in accordance with an exemplary embodiment of the present invention.
Figure 2:
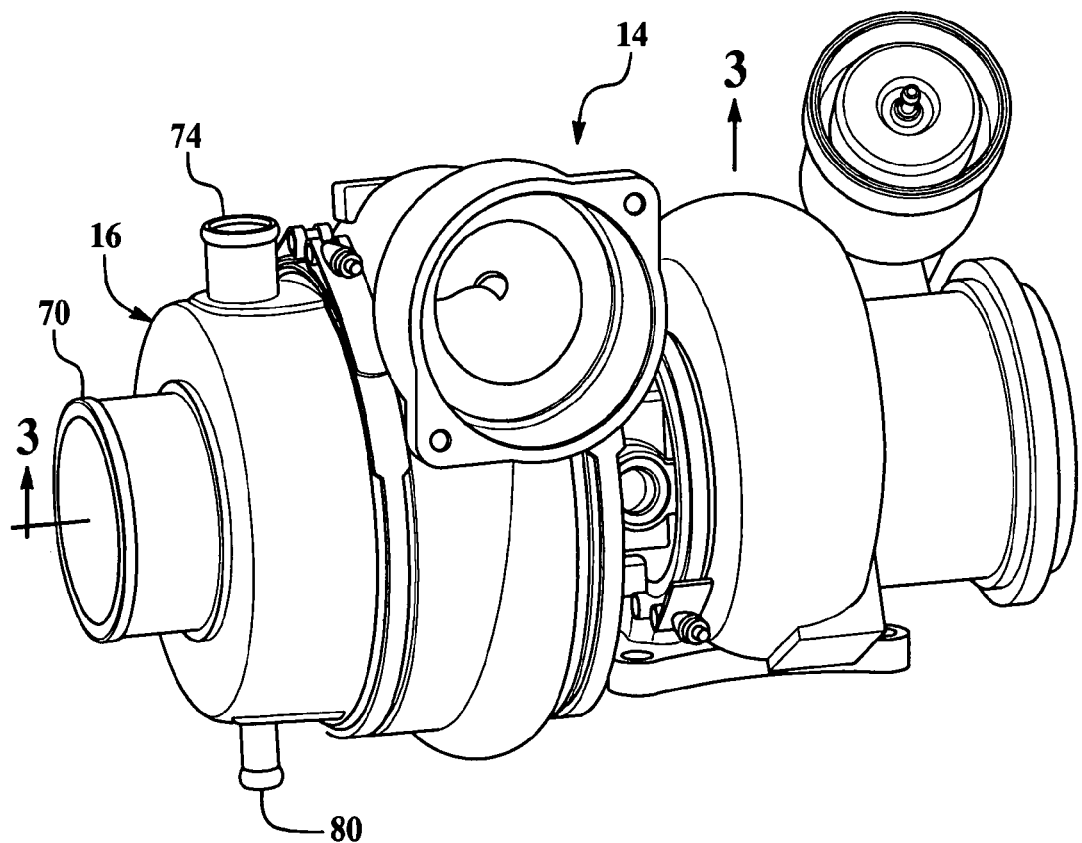
FIG. 2 is a perspective view of a turbocharger having the filter utilized in FIG. 1.
Figure 3:
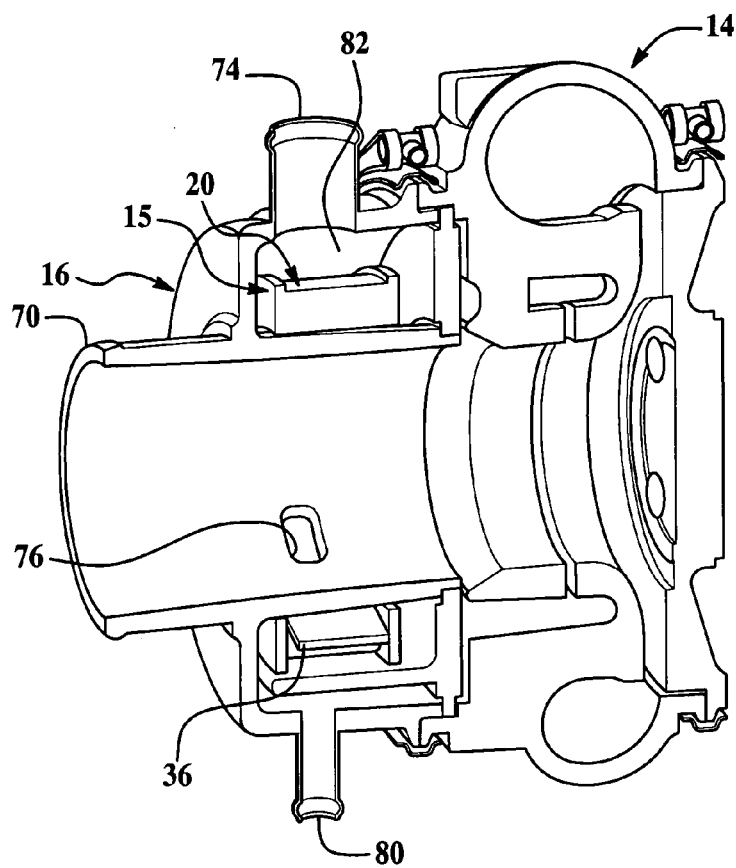
FIG. 3 is a partial sectional view of the turbocharger of FIG. 2 taken along lines 3-3.

Referring now to FIGS. 1-3 and in accordance with an exemplary embodiment, a schematic of an engine and a turbocharger assembly 10 is illustrated. Turbocharger assembly 10 includes an engine 12 and a turbocharger 14. In an exemplary embodiment, turbocharger 14 includes a filter 15 integrated with the turbocharger. For example and in an exemplary embodiment, filter 15 is disposed in a receiving member 16 secured to the turbocharger. Filter 15 is provided for filtering a fluid passing therethrough. In an exemplary embodiment, filter 15 filters fluid such as air routed from engine 12 to filter 15 wherein the air is filtered more than once before being supplied to portions of the turbocharger.

In an exemplary embodiment, filter 15 is configured and positioned so that fluid is deflected away from a first portion of filter 15. A first portion of deflected fluid having contaminates is separated from a second portion of the fluid when the first portion of the fluid moves away from the filter. The second portion of the fluid flows through a second portion of the filter thereby further filtering contaminates from the fluid.

In this manner the fluid is filtered in two stages, wherein the first portion of the fluid having for example heavier or unwanted materials is separated from the second portion of the fluid and the second the portion of the fluid is then further filtered of contaminates when the second portion of the fluid passes through the filter. For example and in an exemplary embodiment, if the fluid is air and the first portion of the fluid includes soot, coalesced oil, moisture, etc., it may not be desirable to have these materials flow into the filter and downstream from the filter, thus the desire to deflect the first portion of the fluid away from the filter.

Figure 4:
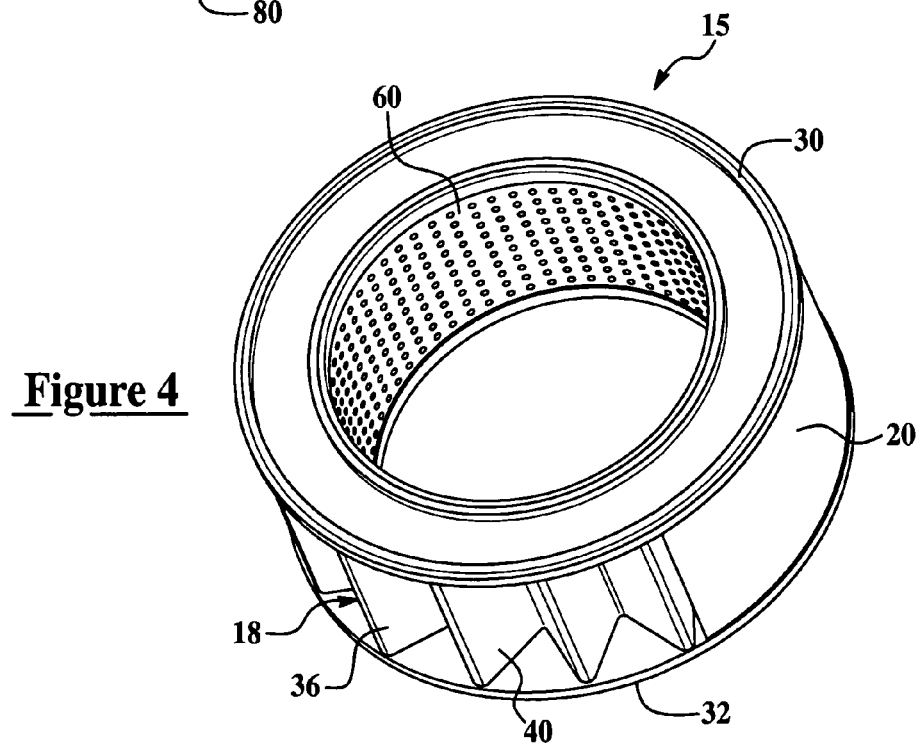
FIG. 4 is a perspective view of the filter of FIG. 1 in accordance with an exemplary embodiment of the present invention.

Referring now to FIG. 4 and in accordance with an exemplary embodiment, filter 15 is illustrated. Filter 15 includes a filter media 18 and a deflecting member 20 disposed over a portion of filter media 18. Filter media 18 is provided for filtering fluid passing therethrough. Deflecting member 20 is provided to deflect fluid away from a portion of filter media 18 covered by deflecting member 20. Filter 15 is further configured to allow a portion of the fluid to flow through a portion of filter media 18 that is not covered by deflecting member 20.

Figure 5:
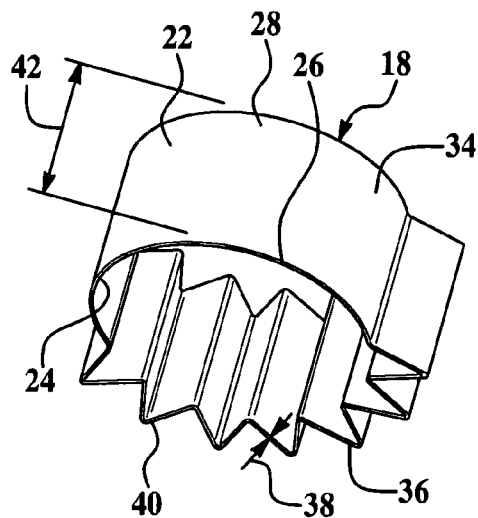
FIG. 5 is a perspective view of a filter media utilized in the filter of FIG. 4 in accordance with an exemplary embodiment.

Referring now to FIG. 5 and in accordance with an exemplary embodiment, filter media 18 is illustrated. In an exemplary embodiment, filter media 18 has a substantially uniform surface about an outer periphery of the filter media. In another exemplary embodiment, filter media 18 includes an outer periphery having a roughened surface, wherein the roughened surface has a greater surface area for filtering fluid passing therethrough compared to the uniform or non-roughened surface. For example and in one exemplary embodiment, filter media 18 includes a roughened surface such as pleats, ribs, etc. In another exemplary embodiment, filter media 18 includes a surface having recessed areas or indentations. In yet another exemplary embodiment, filter media 18 includes a combination of the aforementioned embodiments.

In an exemplary embodiment, filter media 18 includes an outer periphery 22, an inner periphery 24, a first end portion 26, a second end portion 28, a first end cap 30, and a second end cap 32. First and second end caps 30, 32 have been omitted from FIG. 5 to more clearly show the other details of filter media 18. Outer periphery 22 includes a covered portion 34 and an open portion 36. Covered portion 34 is configured to receive deflecting member 20. When deflecting member 20 is disposed over covered portion 34, fluid is substantially blocked by the deflecting member from flowing onto covered portion 34. Open portion 36 of outer periphery 22 is configured to allow fluid to pass therethrough in a direction toward inner periphery 24.

In an exemplary embodiment, outer periphery 22 and inner periphery 24 are spaced apart having a uniform thickness around a periphery of filter media 18. In an alternative exemplary embodiment, outer periphery 22 and inner periphery 24 are spaced apart in a manner defining a non-uniform thickness around a periphery of filter media 18. In one exemplary embodiment, outer periphery 22 has a shape that is substantially similar to a shape of inner periphery 24. In another exemplary embodiment, outer periphery 22 has a shape that is different than a shape of inner periphery 24. And in an exemplary embodiment, the outer periphery and the inner periphery of the filter media may have a geometric shape, a non-geometric shape or a combination thereof.

In one exemplary embodiment, covered portion 34 has a configuration that is substantially similar to a configuration of open portion 36. In another exemplary embodiment, the covered portion has a configuration that is different from a configuration of the open portion. A configuration of covered portion 34 and open portion 36 includes materials, shapes, construction styles, filtration and flow properties.

For example and in an exemplary embodiment, outer periphery 22 and inner periphery 24 of filter media 18 are spaced apart defining a thickness 38 of filter media 18. Covered portion 34 is a curved portion configured to receive deflecting member 20. Outer periphery 22 includes a roughened portion 40 having a plurality of pleats defining a plurality of peaks and valleys. Surfaces between the peaks and valleys of the pleats have substantially more surface area for filtering fluid passing therethrough compared to a substantially smooth surface without the pleats.

First end portion 26 is spaced apart from second end portion 28 defining a width 42 of filter media 18. First end portion 26 includes a portion of inner periphery 24 and a portion of outer periphery 22. First end portion 26 is configured to receive first end cap 30. Second end portion 28 includes a portion of inner periphery 24 and a portion of outer periphery 22. Second end portion 28 is configured to receive second end cap 32.

In an exemplary embodiment, filter media 18 is formed of a substantially homogeneous material. In an alternative exemplary embodiment, filter media 18 is formed from a plurality of materials. In another alternative exemplary embodiment, filter media 18 includes a plurality of layers that form filter media 18. For example and in an exemplary embodiment, one or more layers of filter media 18 include anyone of RAYON fibers, RAYON fibers impregnated with phenolic resin, Borosilicate micro glass, plastic, metal, paper or a combination thereof. In another alternative exemplary embodiment, filter media 18 includes a mesh construction. For example and in an exemplary embodiment, filter media 18 includes a mesh having a range of one to seventy-five microns. In exemplary embodiments, filter 15 is configured to operate at a high temperature. For example and in an exemplary embodiment, filter 15 has an operational temperature of about 300° F.

Figure 6:
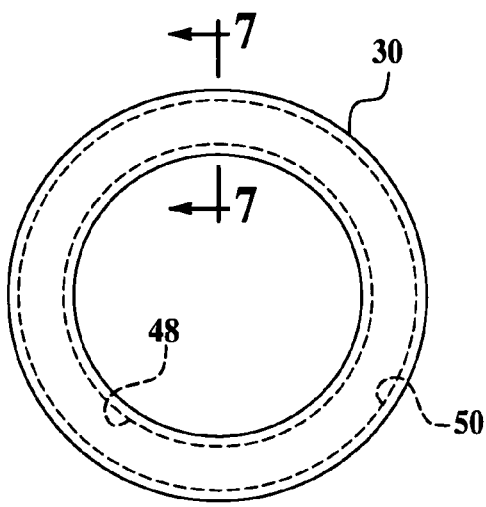
FIG. 6 is a top view of an end cap utilized in the filter of FIG. 4 in accordance with an exemplary embodiment.
Figure 7:
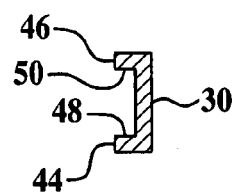
FIG. 7 is a sectional view of the end cap of FIG. 6 taken along lines 7-7.

Referring now to FIGS. 6 and 7 and in accordance with an exemplary embodiment first and second end caps 30, 32 are illustrated. First and second end caps 30, 32 are provided so fluid flows through open portion 36 of filter media 18 between the first and second end caps when the first and second end caps are secured to filter media 18. First end cap 30 is configured to be secured to first end portion 26 of filter media 18. Second end cap 32 is configured to be secured to second end portion 28 of filter media 18. In another exemplary embodiment, first and second end caps 30, 32 are further configured to substantially maintain a shape of outer and inner peripheries 22, 24 of filter media 18 at first and second end portions 26, 28, respectively.

In an exemplary embodiment, second end cap 32 is constructed substantially similar to first end cap 30, therefore only first end cap 30 will be described in detail. In an exemplary embodiment, first end cap 30 is substantially ring shaped having a substantially channel shaped cross section, as illustrated in FIG. 7. First end cap 30 includes a first leg member 44 and a second leg member 46. First leg member 44 includes a first surface 48. First surface 48 has a periphery substantially similar to at least a portion of inner periphery 24 of filter media 18. Second leg member 46 includes a second surface 50. Second surface 50 has a periphery substantially similar to at least a portion of outer periphery 22 of filter media 18. First end cap 30 is configured so first surface 48 is disposed over a portion of inner periphery 24 and second surface 50 is disposed over a portion of outer periphery 22 when first end cap 30 is secured to first end portion 26 of filter media 18.

Figure 8:
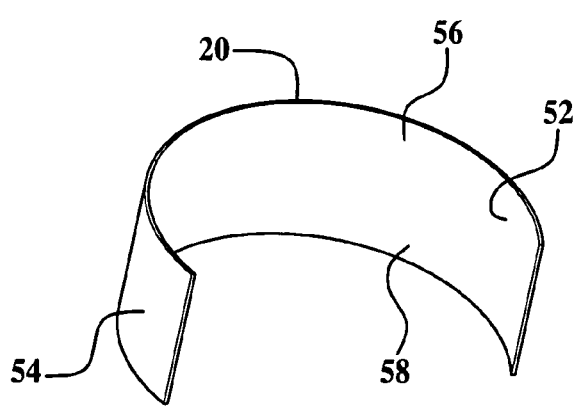
FIG. 8 is a perspective view of a deflecting member utilized in the filter of FIG. 4 in accordance with an exemplary embodiment.

Referring now to FIG. 8 and in accordance with an exemplary embodiment, deflecting member 20 is illustrated. Deflecting member 20 is provided to substantially deflect fluid away from covered portion 34 of filter media 18 when the deflecting member is disposed over the covered portion.

In an exemplary embodiment, deflecting member 20 includes an inner periphery 52, an outer periphery 54, a first end portion 56, and a second end portion 58. In an exemplary embodiment, inner periphery 52 has a shape substantially similar to that of covered portion 34 to substantially prevent fluid from contacting the covered portion when the deflecting member is disposed over the covered portion. Outer periphery 54 is configured to deflect fluid away from covered portion 34 when the deflecting member is disposed over the covered portion. In an exemplary embodiment, first end portion 56 of deflecting member 20 is spaced apart from second end portion 58 defining a width of deflecting member 20 that is substantially similar to width 42 of filter media 18. In an exemplary embodiment, a configuration of inner periphery 52 is substantially similar to a configuration of outer periphery 54. In an alternative exemplary embodiment, a configuration of the inner periphery is different than a configuration of the outer periphery.

In an exemplary embodiment, deflecting member 20 is substantially held in position over covered portion 34 of the filter media. Maintaining the deflecting member in a position over the covered portion ensures that fluid is substantially deflected away from the covered portion. For example and in an exemplary embodiment, first end portion 56 of the deflecting member is configured to be received by first end cap 30 for holding the deflecting member over covered portion 34 of the filter media when first end cap 30 is secured to first end portion 26 of the filter media. Similarly, second end portion 58 of the deflecting member is configured to be received by second end cap 32 for holding the deflecting member over covered portion 34 when second end cap 32 is secured to second end portion 28 of the filter media. Of course, in an alternative exemplary embodiment, the deflecting member can be held over the covered portion by other means such as with an adhesive or the like. And in another alternative exemplary embodiment, the deflecting member is an integral portion or layer of the filter media.

In an exemplary embodiment, deflecting member 20 has a configuration that aids in deflecting fluid away from covered portion 34. For example and in an exemplary embodiment, the outer periphery of the deflecting member includes a curved portion that deflects the fluid in a direction away from the covered portion. In an alternative exemplary embodiment, the outer periphery of the deflecting member includes a material and or a surface texture so that the deflecting member does not easily absorb fluid that contacts the outer periphery.

Figure 9:
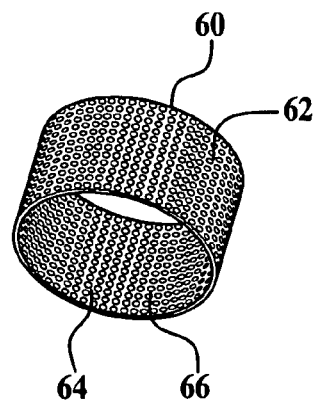
FIG. 9 is a perspective view of a screen member utilized in the filter of FIG. 4 in accordance with an exemplary embodiment.

Referring now to FIGS. 4 and 9 and in accordance with an exemplary embodiment, a protective layer or member 60 is illustrated. In an exemplary embodiment, filter 15 includes protective member 60. Protective member 60 is provided to protect inner periphery 24 of filter media 18 yet allow fluid to pass through protective member 60. In an exemplary embodiment, protective member 60 includes an outer periphery 62, an inner periphery 64, and a plurality of apertures 66 extending therethrough. For example and in an exemplary embodiment, protective member 60 is a screen member.

In an exemplary embodiment, outer periphery 62 has a configuration that is substantially similar to a configuration of inner periphery 24 of filter media 18. Inner periphery 64 of protective member 60 may or may not be configured similar to outer periphery 62. Plurality of apertures 66 are configured so fluid passes therethrough after passing through filter media 18. In an exemplary embodiment, the plurality of apertures 66 are configured to allow a predetermined amount of fluid to pass therethrough after having passed through filter media 18. In another exemplary embodiment, protective member 60 is held in a position over inner periphery 24 by first and second end caps 30, 32. In an alternative exemplary embodiment of filter 15, the filter media may include an integral portion or layer configured to function substantially similar as protective member 60 described above.

Referring now to FIGS. 2 and 3 and in accordance with an exemplary embodiment, turbocharger 14 having receiving member 16 and filter 15 is illustrated. Filter 15 is disposed in receiving member 16 that is secured to the turbocharger. Filter 15 is utilized to provide filtered fluid to turbocharger 14. In an exemplary embodiment, filter 15 is held within receiving member 16 in a substantially fixed position so fluid is routed along a specific path through filter 15 before being supplied to portions of the turbocharger.

In an exemplary embodiment, filter 15 is positioned so fluid is deflected away from covered portion 34 of filter media 18 by deflecting member 20. A first portion of the deflected fluid, unfiltered fluid, moves away from open portion 36 of filter media 18. A second portion of the fluid flows through open portion 36 of filter media 18, thereby providing filtered fluid to the turbocharger. Deflecting the first portion of the fluid away from open portion 36 is advantageous when the first portion includes material that may not be desirable to supply to the turbocharger.

For example, if the fluid is substantially air, it may not be desirable to route portions of the air such as oil, moisture, vapors, contaminants, and materials heavier than air, etc. through filter 15 to the turbocharger. In addition to damaging or degrading performance of the turbocharger, materials in the unfiltered fluid may clog, degrade performance of the filter or otherwise reduce the filter's useful life, thus it is desirable to not route those materials into the filter. In another exemplary embodiment, filter 15 is positioned so gravity aids in moving the unfiltered fluid away from open portion 36.

Figure 10:
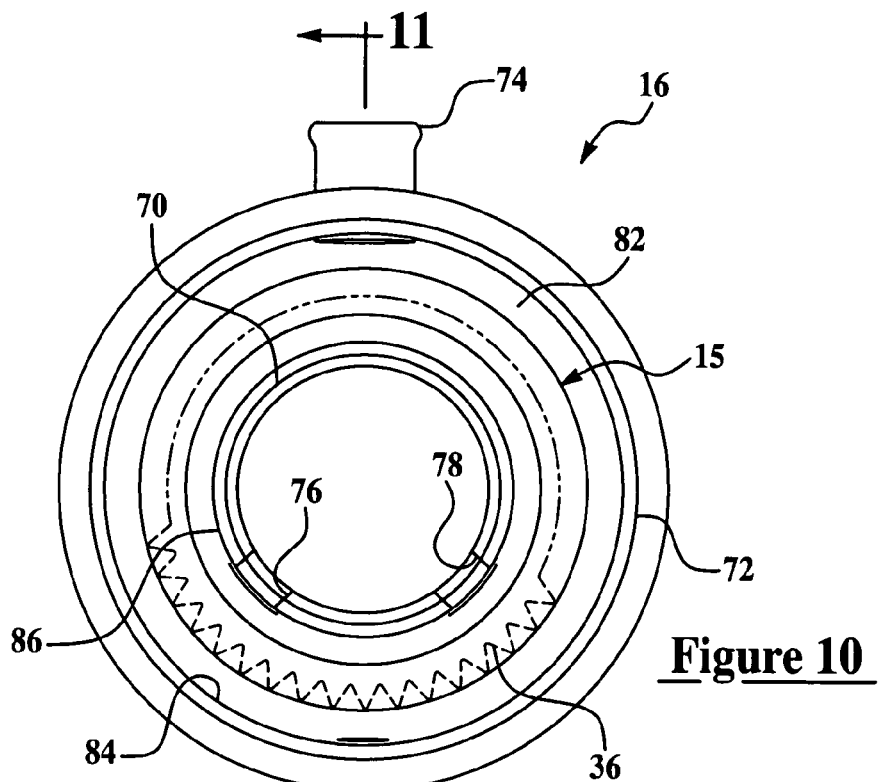
FIG. 10 is a side view of a receiving member utilized with the turbocharger of FIG. 2 in accordance with an exemplary embodiment.
Figure 11:
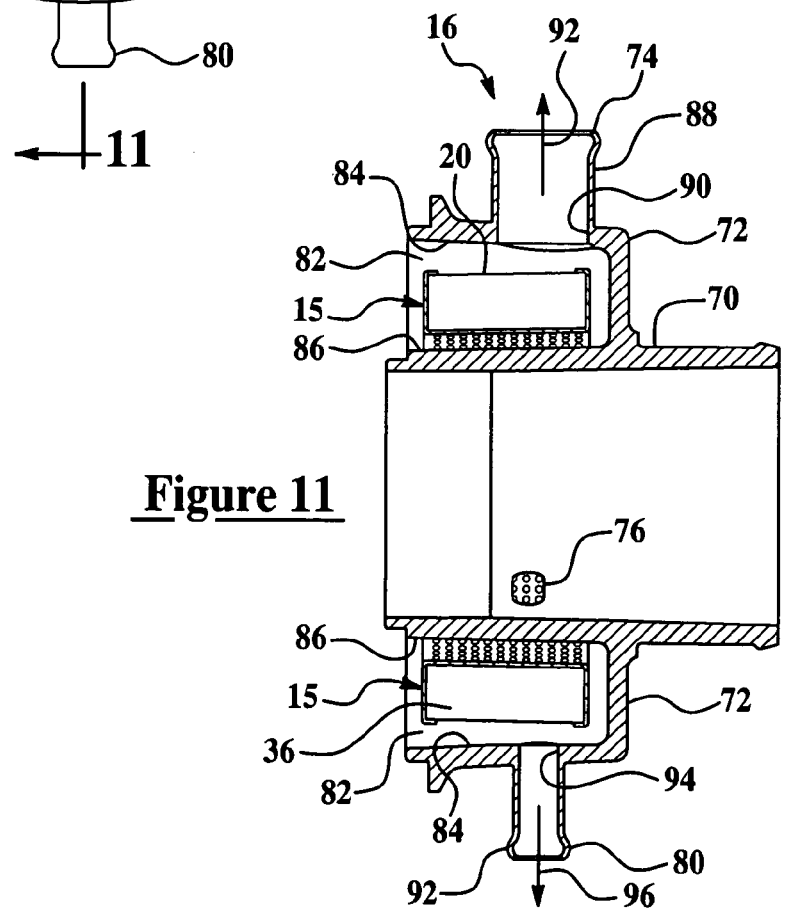
FIG. 11 is a sectional view of the receiving member of FIG. 10 taken along line 11-11.

Referring now to FIGS. 10 and 11 and in accordance with an exemplary embodiment, receiving member 16 having filter 15 is illustrated. In an exemplary embodiment, receiving member 16 includes a tubular member 70, a walled portion 72, a fluid inlet 74, fluid outlets 76, 78, and a drain outlet 80. Walled portion 72 extends away from tubular member 70 defining a receiving area 82 between tubular member 70 and walled portion 72 configured for receiving filter 15 therein. Filter 15 is received into receiving area 82 between an inner surface 84 of walled portion 72 and an outer surface 86 of tubular member 70. In an alternative exemplary embodiment, a configuration of the receiving area is determined by the configuration of filter 15 and not limited by the illustrations of the Figures herein.

Fluid inlet 74 is provided for routing fluid into receiving area 82. In an exemplary embodiment, fluid inlet 74 is defined by a tubular member 88 secured to walled portion 72. Walled portion 72 includes an aperture 90 in fluid communication with the bore of tubular member 88. The bore of tubular member 88 and aperture 90 define a flow path 92 into receiving area 82 for fluid being routed toward filter 15 disposed within receiving area 82. Additionally, fluid inlet 74 and receiving area 82 are configured so that deflecting member 20 substantially overlaps fluid inlet 74 when filter 15 is positioned within receiving area 82.

In an exemplary embodiment, fluid outlets 76, 78 are provided to route the second portion of deflected fluid from receiving area 82 into the bore of tubular member 70 toward portions of the turbocharger after the second portion of deflected fluid has passed through open portion 36 of filter media 18. Two spaced apart apertures define fluid outlets 76, 78 wherein each aperture extends through a wall portion of tubular member 70 from receiving area 82 to the bore of tubular member 70. In an exemplary embodiment, fluid outlets 76, 78 are positioned so that open portion 36 of filter media 18 substantially overlaps fluid outlets 76, 78 and deflecting member 20 substantially overlaps fluid inlet 74 when filter 15 is positioned within receiving area 82.

In an alternative exemplary embodiment, it is contemplated that the fluid outlet can have a configuration different from fluid outlets 76, 78 for routing the second portion of deflected fluid from receiving area 82 into the bore of tubular member 70 after the second portion of deflected fluid has passed through the open portion of the filter media. For example and in an alternative exemplary embodiment, the fluid outlet is a single elongated aperture positioned so the open portion of the filter media substantially overlaps the single elongated aperture when the filter is positioned within the receiving area. In another alternative exemplary embodiment, the fluid outlet is three or more apertures positioned so the open portion of the filter media substantially overlaps the three or more apertures when the filter is positioned within the receiving area.

In an exemplary embodiment, drain outlet 80 is provided so the unfiltered fluid flows away from the open portion of the filter media through drain outlet 80 when filter 15 is disposed within receiving area 82. For example, if the unfiltered fluid is air containing materials such as but not limited to oil, moisture, vapors, contaminants, etc. it is desired to have the unfiltered air containing those materials flow through drain outlet 80 rather than flowing through the filter to the turbocharger. In one exemplary embodiment, drain outlet 80 is a conduit positioned and configured to route unfiltered fluid out of receiving area 82 and away from open portion 36. In another exemplary embodiment, drain outlet 80 is an aperture of walled portion 72, wherein the unfiltered fluid moves away from the open portion of the filter media through the aperture toward a cavity exterior to the receiving area.

In an exemplary embodiment, drain outlet 80 is defined by a tubular member 92 secured to walled portion 72. Walled portion 72 includes an aperture 94 in fluid communication with the bore of tubular member 92. The bore of tubular member 92 and aperture 94 define a flow path 96 out of receiving area 82 for the unfiltered fluid to move away from the open portion of the filter media within receiving area 82. For example and in an exemplary embodiment, drain outlet 80 is positioned substantially across from fluid outlets 76, 78. Unfiltered fluid flows through drain outlet 80 in a direction away from fluid outlets 76, 78 and open portion 36 when filter 15 is positioned within receiving area 82. In another exemplary embodiment, receiving member 16 and drain outlet 80 may be configured and positioned so that gravity urges the unfiltered fluid to move away from open portion 36 of filter media 18 in a direction through drain outlet 80.

Referring now to FIGS. 2, 3 and 10 and in an exemplary embodiment, filter 15 being used to provide filtered fluid to the turbocharger is illustrated. Receiving member 16 and filter 15 are positioned so gravity aids in moving the unfiltered fluid away from open portion 36 through drain outlet 80 of receiving member 16.

Receiving member 16 is positioned such that tubular member 70 extends in a substantially horizontal direction and drain outlet 80 extends in a substantially vertical downward direction with respect to tubular member 70. Filter 15 is positioned in receiving area 82 of receiving member 16 so that open portion 36 of filter media 18 substantially overlaps drain outlet 80 and fluid outlets 76, 78 while deflecting member 20 substantially overlaps fluid inlet 74, as illustrated in FIG. 10.

In an exemplary embodiment, filter 15 is held in a substantially fixed position within receiving member 16 when a surface of filter 15 has an interference fit with a surface defining the receiving area. For example and in an exemplary embodiment, surfaces of each of first and second end caps 30, 32 have an interference fit with surfaces 84, 86 of receiving area 82 of the receiving member. Additionally, the interference fit between the surfaces of the first and second end caps and surfaces 84, 86 of the receiving area substantially prevents the deflected fluid from leaking away from the filter between the first and second end caps and surfaces 84, 86 of the receiving area. In another exemplary embodiment, filter 15 is held in a substantially fixed position within receiving member 16 when an outer periphery of filter 15 includes a recess configured to engage a protrusion of an inner surface defining receiving area 82. Of course, in another exemplary embodiment, an outer periphery of filter 15 can include a protrusion configured to engage a recess of an inner surface defining the receiving area.

In an exemplary embodiment, fluid, such as the air from engine 12, is routed into receiving area 82 through fluid inlet 74 toward deflecting member 20 of filter 15. The fluid is then routed around filter 15 between a portion of inner surface 84 of walled portion 72 and deflecting member 20 in a direction toward open portion 36 of filter media 18. A portion of the fluid passes through open portion 36 and into the bore of tubular member 70 through fluid outlets 76, 78, the portion of the fluid thereby being filtered by filter media 18 upon passing therethrough. The unfiltered fluid that does not pass through open portion 36 moves away from receiving area 82 through drain outlet 80.

For example, in an exemplary embodiment, if the fluid is air from a crankcase of engine 12, unfiltered air may include materials such as but not limited to oil, moisture, vapors, contaminants heavier than air etc., wherein the unfiltered air having those materials moves away from open portion 36 and out from receiving area 82 through drain outlet 80 due to the configuration and positioning of receiving member 16 and filter 15.

The exemplary embodiments of filter 15 thus described provide filtered fluid wherein the fluid is deflected away from a covered portion of the filter. The filter is further configured so a first portion of deflected fluid moves away from the filter while a second portion of the deflected fluid is filtered by passing through an open portion of the filter, thereby reducing a likelihood of the first portion of the deflected fluid entering the open portion of the filter.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A filter for filtering a fluid, comprising:
   a filter media having an outer periphery, an inner periphery, a first end portion, and a second end portion;
   a first end cap disposed on the first end portion;
   a second end cap disposed on the second end portion; and
   a deflecting member disposed over a portion of the outer periphery, wherein the fluid is deflected by the deflecting member and a portion of the fluid is filtered by the filter media by entering through a portion of the outer periphery not covered by the deflecting member, wherein a configuration of the portion of the outer periphery covered by the deflecting member is different than a configuration of the portion of the outer periphery not covered by the deflecting member.

2. The filter as in claim 1, wherein the portion of the outer periphery not covered by the deflecting member comprises a pleated portion.

3. The filter as in claim 1, wherein an operational temperature of the filter media is about 300° F.

4. The filter as in claim 1, wherein the deflecting member is an integral portion of the filter media.

5. The filter as in claim 1, further comprising a protective layer disposed over the inner periphery of the filter media, the protective layer configured to allow the fluid to pass therethrough.

6. The filter as in claim 5, wherein the protective layer is a screen member having a plurality of apertures extending therethrough.

7. The filter as in claim 1, wherein the filter media further comprises a plurality of layers.

8. The filter as in claim 7, wherein one of the plurality of layers comprises one of a fiber layer, a Borosilicate micro glass layer, a high-temperature plastic layer.

9. The filter as in claim 7, wherein one of the plurality of layers is a protective layer defining the inner periphery of the filter media, the protective layer configured to allow the fluid to pass therethrough.

10. The filter as in claim 9, wherein the protective layer is a screen member having a plurality of apertures extending therethrough.

11. The filter as in claim 1, wherein the filter media comprises a mesh.

12. The filter as in claim 11, further comprising a protective layer disposed over the inner periphery of the filter media, the protective layer configured to allow the fluid to pass therethrough.

13. The filter as in claim 11, wherein the mesh has a plurality of apertures having a size in a range of 1 to 75 microns.

14. The filter as in claim 11, wherein the mesh comprises one of a fiber mesh, a Borosilicate micro glass mesh, a high-temperature plastic mesh.

15. A turbocharger, comprising:
    a receiving member integrated with the turbocharger, the receiving member having a receiving area, a fluid inlet, a fluid outlet, and a drain outlet, the receiving area being configured to receive a filter disposed therein, wherein the fluid inlet and the fluid outlet define a flow path through the filter disposed in the receiving area, the filter comprising:
    a filter media having an outer periphery, an inner periphery, a first end portion, and a second end portion;
    a first end cap disposed on the first end portion;
    a second end cap disposed on the second end portion; and
    a deflecting member disposed over a portion of the outer periphery,
    wherein the fluid enters the fluid inlet and is deflected by the deflecting member and a first portion of deflected fluid flows through the drain outlet in a direction away from the portion of the filter media not covered by the deflecting member and a second portion of the deflected fluid flows along the flow path through the filter media and the fluid outlet to the turbocharger by entering the filter media through a portion of the outer periphery not covered by the deflecting member, wherein the receiving member and the filter are positioned so the deflecting member substantially overlaps the fluid inlet and the portion of the outer periphery not covered by the deflecting member substantially overlaps the fluid outlet.

16. The turbocharger as in claim 15, wherein the receiving member and the filter are further positioned so that a gravitational force aids in moving the first portion of the deflected fluid in a direction away from the portion of the outer periphery not covered by the deflecting member.

17. The turbocharger as in claim 15, wherein the filter media further comprises a plurality of layers, and the portion of the outer periphery not covered by the deflecting portion comprises a pleated portion, and a protective layer is disposed over the inner periphery of the filter media, the protective layer configured to allow the fluid to pass therethrough.

18. The turbocharger as in claim 15, wherein the fluid is air from an engine crankcase.

19. The turbocharger as in claim 15, wherein the deflecting member is an integral portion of the filter media.

20. The turbocharger as in claim 15, wherein the filter media further comprises a mesh, and the portion of the outer periphery not covered by the deflecting portion comprises a pleated portion, and a protective layer is disposed over the inner periphery of the filter media, the protective layer configured to allow the fluid to pass therethrough.

21. The turbocharger as in claim 20, wherein the mesh has a plurality of apertures having a size in a range of 1 to 75 microns.

22. A filter for filtering a fluid, comprising:
    a filter media having an outer periphery, an inner periphery, a first end portion, and a second end portion;
    a first end cap disposed on the first end portion;
    a second end cap disposed on the second end portion; and
    a deflecting member disposed over a portion of the outer periphery, wherein the fluid is deflected by the deflecting member and a portion of the fluid is filtered by the filter media by entering through a portion of the outer periphery not covered by the deflecting member, wherein the deflecting member is an integral layer of the filter media.

* * * * *